US011899686B2

(12) United States Patent
Eltsufin

(10) Patent No.: US 11,899,686 B2
(45) Date of Patent: Feb. 13, 2024

(54) METHOD AND SYSTEM FOR MANAGING BI-TEMPORAL DATA

(71) Applicant: JPMorgan Chase Bank, N.A., New York, NY (US)

(72) Inventor: Eugene Eltsufin, Jersey City, NJ (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 71 days.

(21) Appl. No.: 17/649,260

(22) Filed: Jan. 28, 2022

(65) Prior Publication Data

US 2023/0244692 A1 Aug. 3, 2023

(51) Int. Cl.
*G06F 16/27* (2019.01)
*G06F 16/23* (2019.01)
*G06F 9/54* (2006.01)

(52) U.S. Cl.
CPC .......... *G06F 16/27* (2019.01); *G06F 9/54* (2013.01); *G06F 16/2358* (2019.01)

(58) Field of Classification Search
None
See application file for complete search history.

(56) References Cited

U.S. PATENT DOCUMENTS

| | | | |
|---|---|---|---|
| 6,434,683 B1 | 8/2002 | West et al. | |
| 8,694,623 B1 * | 4/2014 | Stephen | H04L 41/08 709/224 |
| 10,824,636 B2 * | 11/2020 | Fischer | G06F 16/256 |
| 10,976,911 B2 * | 4/2021 | Hendrix | G06F 3/04842 |
| 2004/0088382 A1 | 5/2004 | Therrien et al. | |
| 2007/0043733 A1 | 2/2007 | Cannon et al. | |
| 2007/0143680 A1 | 6/2007 | Cowan et al. | |
| 2011/0022573 A1 | 1/2011 | Champlin et al. | |
| 2011/0313969 A1 * | 12/2011 | Ramu | G06F 16/254 707/602 |
| 2016/0350367 A1 * | 12/2016 | Fischer | G06F 16/256 |
| 2017/0193028 A1 * | 7/2017 | Iyengar | G06F 16/27 |
| 2023/0244692 A1 * | 8/2023 | Eltsufin | G06F 9/54 707/618 |

OTHER PUBLICATIONS

International Search Report and Written Opinion issued in International Patent Application No. PCT/US2022/014327, dated May 3, 2022.

* cited by examiner

*Primary Examiner* — Kim T Nguyen

(74) *Attorney, Agent, or Firm* — Greenblum & Bernstein, P.L.C.

(57) ABSTRACT

A method for facilitating usage and storage of bi-temporal data is disclosed. The method includes receiving, via an application programming interface, an update request, the update request relating to an update of a data object with a new data object; identifying a builder pattern that corresponds to the data object based on a data type of the data object; automatically generating, by using the identified builder pattern, a delta object based on the request, the delta object relating to a difference between the data object and the new data object; associating the delta object with an axial value, the axial value including a reported time and an effective time; and persisting the delta object and the corresponding association as an event that represents the difference between the data object and the new data object.

20 Claims, 4 Drawing Sheets

METHOD AND SYSTEM FOR MANAGING BI-TEMPORAL DATA

BACKGROUND

1. Field of the Disclosure

This technology generally relates to methods and systems for managing data, and more particularly to methods and systems for facilitating usage and storage of bi-temporal data by using delta objects and sync schedules.

2. Background Information

Many business entities maintain large volumes of data objects to facilitate business operations and provide services to users. Often, these large volumes of data objects must be managed and updated with new data. Historically, implementations of conventional management techniques have resulted in varying degrees of success with respect to optimizing performance and enabling features such as, for example, enabling bi-temporal data storage to reproduce a historical state of the data objects.

One drawback of using the conventional management techniques is that in many instances, updates require write operations that override old values with a new state. As a result, reproductions of a historical state of the overridden data objects are inefficient and often ineffective. Additionally, to enable reproduction of the historical state, conventional management techniques require persistence of the old values as well as the new state. Persisting the old values and the new state requires large storage requirements that are both expensive and difficult to maintain.

Therefore, there is a need to facilitate usage and storage of bi-temporal data by using delta objects and sync schedules to enable optimized data storage and reproduction of any historical state of the data objects.

SUMMARY

The present disclosure, through one or more of its various aspects, embodiments, and/or specific features or sub-components, provides, inter alia, various systems, servers, devices, methods, media, programs, and platforms for facilitating usage and storage of bi-temporal data by using delta objects and sync schedules.

According to an aspect of the present disclosure, a method for facilitating usage and storage of bi-temporal data is disclosed. The method is implemented by at least one processor. The method may include receiving, via an application programming interface, at least one update request, the at least one update request may relate to an update of at least one data object with a new data object; identifying at least one builder pattern that corresponds to the at least one data object based on a data type of the at least one data object; automatically generating, by using the identified at least one builder pattern, at least one delta object based on the at least one request, the at least one delta object may relate to a difference between the at least one data object and the new data object; associating the at least one delta object with at least one axial value, the at least one axial value may include a reported time and an effective time; and persisting the at least one delta object and the corresponding association as an event that represents the difference between the at least one data object and the new data object.

In accordance with an exemplary embodiment, the data type of the at least one data object may include at least one from among a list data type, a set data type, and a dictionary data type.

In accordance with an exemplary embodiment, the reported time may relate to a first time when a change of state is known in a database, and the effective time may relate to a second time when the change of state occurred.

In accordance with an exemplary embodiment, the method may further include receiving, via the application programming interface, at least one state request, the at least one state request may relate to a past state of the at least one data object for a requested time; identifying, by using the at least one axial value, at least one past event that is proximate in time to the requested time, the at least one past event may correspond to the at least one data object; and reconstructing the past state of the at least one data object by using the identified at least one past event and the at least one axial value.

In accordance with an exemplary embodiment, the method may further include generating the past state of the at least one data object based on a result of the reconstructing; and transmitting, via the application programming interface, the generated past state in response to the at least one state request.

In accordance with an exemplary embodiment, the method may further include determining whether at least one syncing criterion is met, the at least one syncing criterion may relate to a predetermined sync schedule; automatically generating at least one sync on an object write operation when the at least one syncing criterion is met; and initiating the object write operation.

In accordance with an exemplary embodiment, the at least one sync may relate to a full state event that acts as a checkpoint in reconstructing a past state.

In accordance with an exemplary embodiment, the at least one syncing criterion may include at least one from among a time-based syncing criterion and an event-based syncing criterion.

In accordance with an exemplary embodiment, the method may further include receiving, via a graphical user interface, at least one new syncing criterion; and updating the predetermined sync schedule based on the at least one new syncing criterion.

According to an aspect of the present disclosure, a computing device configured to implement an execution of a method for facilitating usage and storage of bi-temporal data is disclosed. The computing device including a processor; a memory; and a communication interface coupled to each of the processor and the memory, wherein the processor may be configured to receive, via an application programming interface, at least one update request, the at least one update request may relate to an update of at least one data object with a new data object; identify at least one builder pattern that corresponds to the at least one data object based on a data type of the at least one data object; automatically generate, by using the identified at least one builder pattern, at least one delta object based on the at least one request, the at least one delta object may relate to a difference between the at least one data object and the new data object; associate the at least one delta object with at least one axial value, the at least one axial value may include a reported time and an effective time; and persist the at least one delta object and the corresponding association as an event that represents the difference between the at least one data object and the new data object.

In accordance with an exemplary embodiment, the data type of the at least one data object may include at least one from among a list data type, a set data type, and a dictionary data type.

In accordance with an exemplary embodiment, the reported time may relate to a first time when a change of state is known in a database, and wherein the effective time may relate to a second time when the change of state occurred.

In accordance with an exemplary embodiment, the processor may be further configured to receive, via the application programming interface, at least one state request, the at least one state request may relate to a past state of the at least one data object for a requested time; identify, by using the at least one axial value, at least one past event that is proximate in time to the requested time, the at least one past event may correspond to the at least one data object; and reconstruct the past state of the at least one data object by using the identified at least one past event and the at least one axial value.

In accordance with an exemplary embodiment, the processor may be further configured to generate the past state of the at least one data object based on a result of the reconstructing; and transmit, via the application programming interface, the generated past state in response to the at least one state request.

In accordance with an exemplary embodiment, the processor may be further configured to determine whether at least one syncing criterion is met, the at least one syncing criterion may relate to a predetermined sync schedule; automatically generate at least one sync on an object write operation when the at least one syncing criterion is met; and initiate the object write operation.

In accordance with an exemplary embodiment, the at least one sync may relate to a full state event that acts as a checkpoint in reconstructing a past state.

In accordance with an exemplary embodiment, the at least one syncing criterion may include at least one from among a time-based syncing criterion and an event-based syncing criterion.

In accordance with an exemplary embodiment, the processor may be further configured to receive, via a graphical user interface, at least one new syncing criterion; and update the predetermined sync schedule based on the at least one new syncing criterion.

According to an aspect of the present disclosure, a non-transitory computer readable storage medium storing instructions for facilitating usage and storage of bi-temporal data is disclosed. The storage medium including executable code which, when executed by a processor, may cause the processor to receive, via an application programming interface, at least one update request, the at least one update request may relate to an update of at least one data object with a new data object; identify at least one builder pattern that corresponds to the at least one data object based on a data type of the at least one data object; automatically generate, by using the identified at least one builder pattern, at least one delta object based on the at least one request, the at least one delta object may relate to a difference between the at least one data object and the new data object; associate the at least one delta object with at least one axial value, the at least one axial value may include a reported time and an effective time; and persist the at least one delta object and the corresponding association as an event that represents the difference between the at least one data object and the new data object.

In accordance with an exemplary embodiment, the executable code may further cause the processor to receive, via the application programming interface, at least one state request, the at least one state request may relate to a past state of the at least one data object for a requested time; identify, by using the at least one axial value, at least one past event that is proximate in time to the requested time, the at least one past event may correspond to the at least one data object; and reconstruct the past state of the at least one data object by using the identified at least one past event and the at least one axial value.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
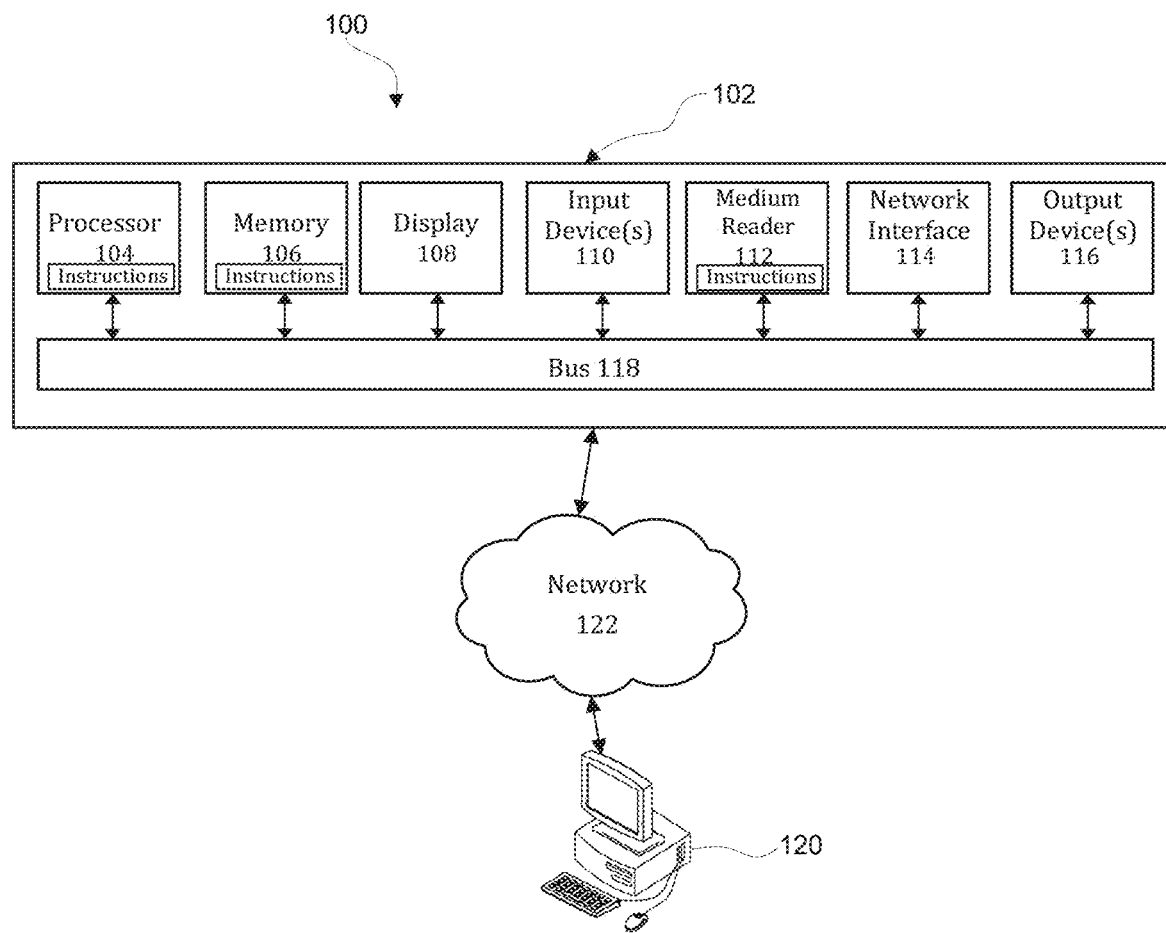
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a virtual desktop computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote-control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software, or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for facilitating usage and storage of bi-temporal data by using delta objects and sync schedules.

Figure 2:
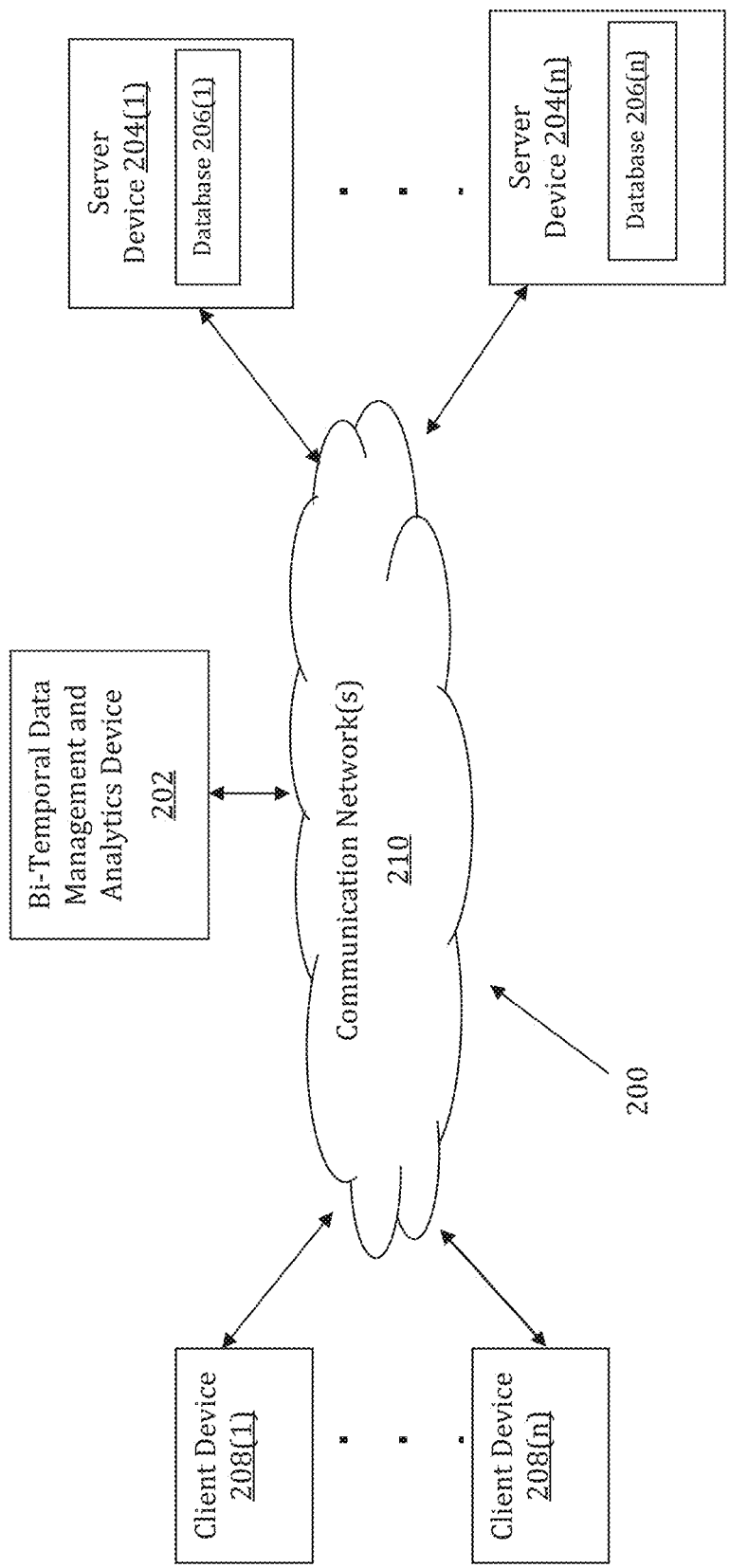
FIG. 2 illustrates an exemplary diagram of a network environment.

Referring to FIG. 2, a schematic of an exemplary network environment 200 for implementing a method for facilitating usage and storage of bi-temporal data by using delta objects and sync schedules is illustrated. In an exemplary embodiment, the method is executable on any networked computer platform, such as, for example, a personal computer (PC).

The method for facilitating usage and storage of bi-temporal data by using delta objects and sync schedules may be implemented by a Bi-Temporal Data Management and Analytics (BDMA) device 202. The BDMA device 202 may be the same or similar to the computer system 102 as described with respect to FIG. 1. The BDMA device 202 may store one or more applications that can include executable instructions that, when executed by the BDMA device 202, cause the BDMA device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the BDMA device 202 itself, may be located in virtual server(s) running in a cloud-based computing environment rather than being tied to one or more specific physical network computing devices. Also, the application(s) may be running in one or more virtual machines (VMs) executing on the BDMA device 202. Additionally, in one or more embodiments of this technology, virtual machine(s) running on the BDMA device 202 may be managed or supervised by a hypervisor.

In the network environment 200 of FIG. 2, the BDMA device 202 is coupled to a plurality of server devices 204(1)-204(n) that hosts a plurality of databases 206(1)-206(n), and also to a plurality of client devices 208(1)-208(n) via communication network(s) 210. A communication interface of the BDMA device 202, such as the network interface 114 of the computer system 102 of FIG. 1, operatively couples and communicates between the BDMA device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the BDMA device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and BDMA devices that efficiently implement a method for facilitating usage and storage of bi-temporal data by using delta objects and sync schedules.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The BDMA device 202 may be a standalone device or integrated with one or more other devices or apparatuses, such as one or more of the server devices 204(1)-204(n), for example. In one particular example, the BDMA device 202 may include or be hosted by one of the server devices 204(1)-204(n), and other arrangements are also possible. Moreover, one or more of the devices of the BDMA device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the BDMA device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to bi-temporal data, update requests, data objects, builder patterns, delta objects, axial values, reported times, and effective times.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a controller/agent approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the BDMA device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the BDMA device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the BDMA device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the BDMA device 202, the server devices 204(1)-204(n), or the client devices 208(1)-208(n), for example, may be configured to operate as virtual instances on the same physical machine. In other words, one or more of the BDMA device 202, the server devices 204(1)-204(n), or the client devices 208(1)-208(n) may operate on the same physical device rather than as separate devices communicating through communication network(s) 210. Additionally, there may be more or fewer BDMA devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication, also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
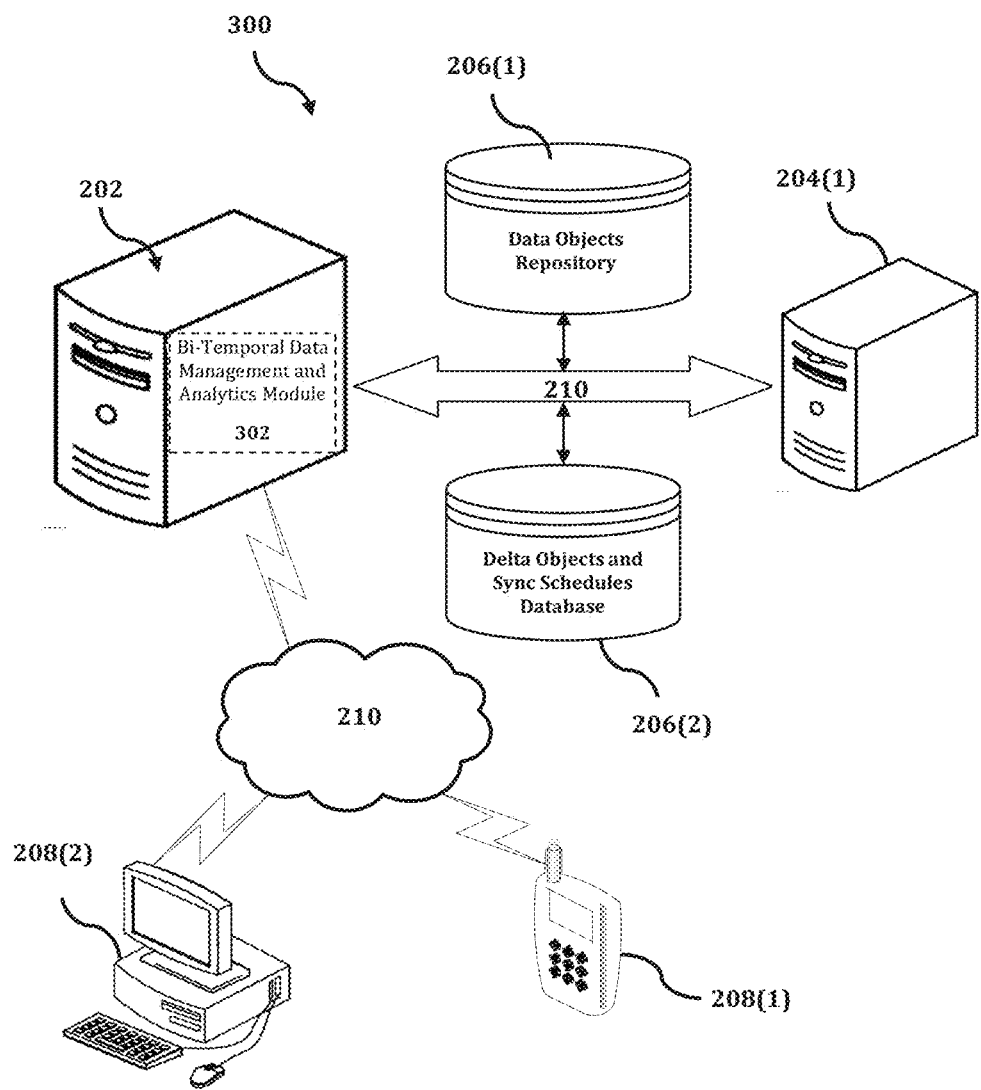
FIG. 3 shows an exemplary system for implementing a method for facilitating usage and storage of bi-temporal data by using delta objects and sync schedules.

The BDMA device 202 is described and shown in FIG. 3 as including a bi-temporal data management and analytics module 302, although it may include other rules, policies, modules, databases, or applications, for example. As will be described below, the bi-temporal data management and analytics module 302 is configured to implement a method for facilitating usage and storage of bi-temporal data by using delta objects and sync schedules.

An exemplary process 300 for implementing a mechanism for facilitating usage and storage of bi-temporal data by using delta objects and sync schedules by utilizing the network environment of FIG. 2 is shown as being executed in FIG. 3. Specifically, a first client device 208(1) and a second client device 208(2) are illustrated as being in communication with BDMA device 202. In this regard, the first client device 208(1) and the second client device 208(2) may be "clients" of the BDMA device 202 and are described herein as such. Nevertheless, it is to be known and understood that the first client device 208(1) and/or the second client device 208(2) need not necessarily be "clients" of the BDMA device 202, or any entity described in association therewith herein. Any additional or alternative relationship may exist between either or both of the first client device 208(1) and the second client device 208(2) and the BDMA device 202, or no relationship may exist.

Further, BDMA device 202 is illustrated as being able to access a data objects repository 206(1) and a delta objects and sync schedules database 206(2). The bi-temporal data management and analytics module 302 may be configured to access these databases for implementing a method for facilitating usage and storage of bi-temporal data by using delta objects and sync schedules.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the BDMA device 202 via broadband or cellular communication. Of course, these embodiments are merely exemplary and are not limiting or exhaustive.

Upon being started, the bi-temporal data management and analytics module 302 executes a process for facilitating usage and storage of bi-temporal data by using delta objects and sync schedules. An exemplary process for facilitating usage and storage of bi-temporal data by using delta objects and sync schedules is generally indicated at flowchart 400 in FIG. 4.

Figure 4:
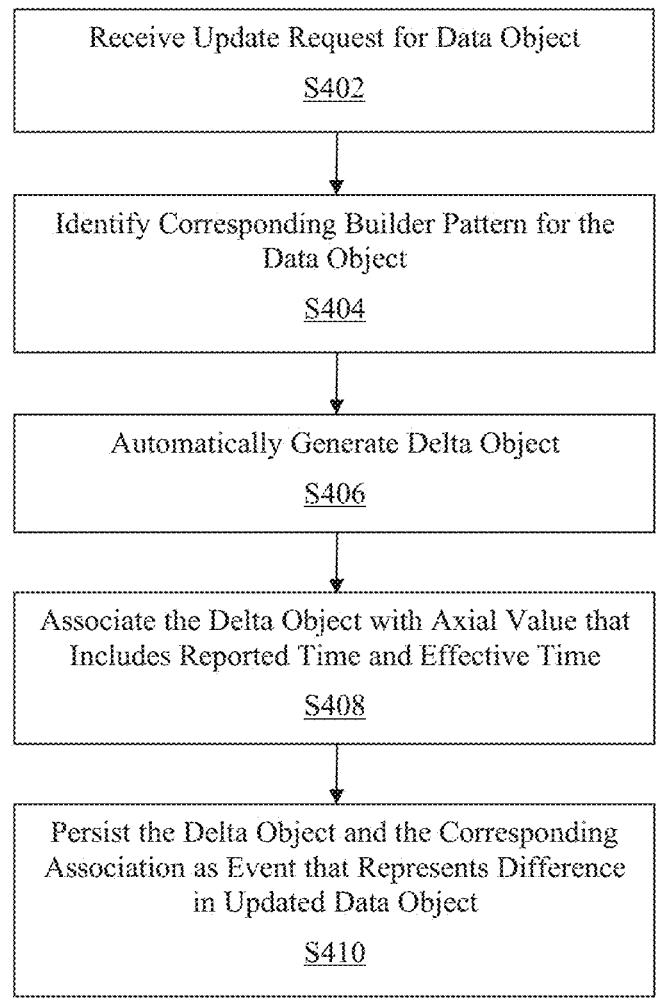
FIG. 4 is a flowchart of an exemplary process for implementing a method for facilitating usage and storage of bi-temporal data by using delta objects and sync schedules.

In the process 400 of FIG. 4, at step S402, an update request may be received via an application programming interface (API). The update request may relate to an update of a data object with a new data object. In an exemplary embodiment, the data object may relate to a data construct that provides a description of something that may be used by a computer and defines its status, its method of operation, and how it interacts with other data objects. The data object may include data, a variable amount of metadata, and a globally unique identifier. In another exemplary embodiment, the data object may include discrete units of data that are stored in a structurally flat data environment.

In another exemplary embodiment, the data object may correspond to an object storage architecture that manages data as objects as opposed to data storage architectures which manages data as a file hierarchy. The object storage architecture may be implemented at multiple levels. For example, the object storage architecture may be implemented at a device level, a system level, and an interface level. In another exemplary embodiment, the object storage architecture may handle large amounts of unstructured data. The unstructured data may not confirm to, or cannot be organized easily into, a traditional relational database with rows and columns.

In another exemplary embodiment, the data object may be created by using a syntax. The syntax may also be used to set properties that correspond to the data object. In another exemplary embodiment, the data object may be persisted as bi-temporal data that facilitates management of historical data along two different timelines. Persisting of the data object as bi-temporal data may be accomplished by calling a write operation and recording an effective time as well as a reported time. The reported time may relate to a first time when a change of state is known in a database and the effective time may relate to a second time when the change of state actually occurred. In another exemplary embodiment, the bi-temporal data object may be updated consistent with disclosures in the present application by using the effective time and the reported time. Likewise, a historical state of the bi-temporal data object may be read consistent with disclosures in the present application by using the effective time, the reported time, an event, and/or a marker.

In another exemplary embodiment, the update request may be received via an API that serves as a connection between computers and computer programs. The API may correspond to an interface that serves as a software intermediary to facilitate communication between applications and/or computing systems. As will be appreciated by a person of ordinary skill in the art, the use of an API allows for the processing disclosed in the present application to be accomplished behind the scenes. Thus, the object interface remains identical to a plain data object and allows for interoperability with many computing systems.

At step S404, a builder pattern that corresponds to the data object may be identified based on a data type of the data object. In an exemplary embodiment, the builder pattern may correspond to a design pattern that separates construction of a complex object from its representation. By separating the construction from its representation, the same construction process may create different representations. In another exemplary embodiment, the builder pattern may include a builder class and a delta class as base interfaces. Users may implement new delta and/or builder types using the base interfaces for desired object types. In another exemplary embodiment, the builder pattern may differentiate two values to generate a delta object and apply the delta object onto a baseline value to derive a new value. As such, each delta type may be paired with a corresponding builder type.

In another exemplary embodiment, the data type of the data object may correspond to the data within the data object. The data type of the data object may include at least one from among a list data type, a set data type, a dictionary data type, and a string data type. The list data type may correspond to an abstract data type that represents a finite number of ordered values, where the same value may occur more than once. The set data type may correspond to an abstract data type that can store unique values without any particular order. The dictionary data type may correspond to an unordered collection of keys and values that is optimized for fast lookup of values. The string data type may correspond to an integer and floating-point unit that is used to represent text.

At step S406, a delta object may be automatically generated by using the identified builder pattern based on the request. The delta object may relate to a difference between the data object and the new data object. The delta object may represent a change and/or a set of changes that are made to the data object. In an exemplary embodiment, a selector function may be usable to help users auto-generate a delta object without worrying about which delta builder to pick. A first selector function may automatically generate delta objects of type list delta, set delta, dictionary delta, and string delta based on input types. A replacement delta may be generated when the two input values are of different types. By default, when the generated delta is not any smaller than directly storing the new value, the first selector may return a replacement delta. A second selector function may always generate a replacement delta that only stores the new value.

At step S408, axial values may be associated with the delta object. In an exemplary embodiment, the axial values may include a reported time and an effective time. Consistent with disclosures in the present application, the reported time may relate to a first time when a change of state is known in a database and the effective time may relate to a second time when the change of state actually occurred. As will be appreciated by a person of ordinary skill in the art, the axial values enable bi-temporal manipulation of the data object and corresponding changes.

At step S410, the delta object and the corresponding association may be persisted as an event that represents the difference between the data object and the new data object.

In an exemplary embodiment, the delta object and the corresponding association may be persisted in any efficient data compression format. The data compression format may correspond to a lightweight data-interchange format such as, for example, a JAVASCRIPT Object Notation (JSON) format. For example, the data compression format may use human-readable text to store and transmit data objects consisting of attribute-value pairs and arrays.

In another exemplary embodiment, persisting the delta object as a separate event enables the change of state to be captured in an immutable event. The immutable event may enable later reconstruction of the change state at any point in time. Thus, the object interface is not changed when support is added for features such as, for example, time traveling. Time traveling may relate to reconstruction of a historical state of a data object that enables a user to see what the data object looked like at any point in time. As will be appreciated by a person of ordinary skill in the art, storage of previous states is highly optimized by using the delta object because a difference from previous values may be automatically computed and recorded in an event without the need to store each and every previous value.

In another exemplary embodiment, reconstruction of the historical state may include receiving a state request via the API. The state request may relate to a request for a past state of the data object for a requested time. A past event that is proximate in time to the requested time may be identified by using the axial values. The past event may correspond to the data object. Then, the past state of the data object may be reconstructed by using the identified past event and the axial values. In another exemplary embodiment, the disclosed system may determine which events happened on and/or before the requested time when a state of the data object at any point in time is requested. The requested state may be reconstructed by applying each event in order.

In another exemplary embodiment, the past state of the data object may be generated based on a result of the reconstructing. The past state of the data object may be generated together with a graphical element that includes information relating to the past state, the data object, and the state request. The graphical element may include a visual representation such as, for example, a dashboard of the past state and may include the corresponding information. The generated past state may be transmitted via the API in response to the state request. In another exemplary embodiment, the generated past state and the graphical element may be displayable via a graphical user interface.

In another exemplary embodiment, to further optimize past state reconstruction and not require application of every event since the inception of the data object, predetermined sync schedules may be utilized. To utilize the predetermined sync schedules, whether a syncing criterion is met may be determined. The syncing criterion may relate to the predetermined sync schedule. Then, a sync on an object write operation may be automatically generated when the syncing criterion is met. In another exemplary embodiment, the object write operation may be initiated to facilitate the syncing.

In another exemplary embodiment, the syncing criterion may include at least one from among a time-based syncing criterion and an event-based syncing criterion. For example, the time-based syncing criterion may require a sync after an amount of time such as, for example, once a day. Likewise, the event-based synching criterion may require a sync after a number of events such as, for example, after ten events have been persisted. In another exemplary embodiment, the sync may relate to a full state event that acts as a checkpoint in reconstructing the past state.

In another exemplary embodiment, the predetermined sync schedules may be updated by receiving a new syncing criterion via a graphical user interface. The predetermined sync schedules may then be updated based on the new syncing criterion. In another exemplary embodiment, various sync schedules may be defined to fit the desired read performance characteristics versus storage requirements. For example, to improve read performance characteristics, a user may increase the frequency of syncs so that reconstruction of the past state only requires computation of a few events. The computation of fewer events results in a faster reconstruction at the expense of additional storage requirements for the more frequent syncs. Conversely, to improve storage requirements, the user may decrease the frequency of syncs so that less storage space is required for the syncs. However, decreasing the frequency of syncs will require computation of more events to reconstruct the past state, which impacts read performance characteristics.

Accordingly, with this technology, an optimized process for facilitating usage and storage of bi-temporal data by using delta objects and sync schedules is disclosed.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for facilitating usage and storage of bi-temporal data, the method being implemented by at least one processor, the method comprising:
   receiving, by the at least one processor via an application programming interface, at least one update request, the at least one update request relating to an update of at least one data object with a new data object;
   identifying, by the at least one processor, at least one builder pattern that corresponds to the at least one data object based on a data type of the at least one data object,
     wherein the at least one builder pattern relates to a design pattern that separates construction of the at least one data object from representation of the at least one data object;
   automatically generating, by the at least one processor using the identified at least one builder pattern, at least one delta object based on the at least one request, the at least one delta object relating to a difference between the at least one data object and the new data object;
   associating, by the at least one processor, the at least one delta object with at least one axial value, the at least one axial value including a reported time and an effective time; and
   persisting, by the at least one processor, the at least one delta object and the corresponding association as an event that represents the difference between the at least one data object and the new data object.

2. The method of claim 1, wherein the data type of the at least one data object includes at least one from among a list data type, a set data type, and a dictionary data type.

3. The method of claim 1, wherein the reported time relates to a first time when a change of state is known in a database, and wherein the effective time relates to a second time when the change of state occurred.

4. The method of claim 1, further comprising:
   receiving, by the at least one processor via the application programming interface, at least one state request, the at least one state request relating to a past state of the at least one data object for a requested time;
   identifying, by the at least one processor using the at least one axial value, at least one past event that is proximate in time to the requested time, the at least one past event corresponding to the at least one data object; and
   reconstructing, by the at least one processor, the past state of the at least one data object by using the identified at least one past event and the at least one axial value.

5. The method of claim 4, further comprising:
   generating, by the at least one processor, the past state of the at least one data object based on a result of the reconstructing; and
   transmitting, by the at least one processor via the application programming interface, the generated past state in response to the at least one state request.

6. The method of claim 1, further comprising:
   determining, by the at least one processor, whether at least one syncing criterion is met, the at least one syncing criterion relating to a predetermined sync schedule;

automatically generating, by the at least one processor, at least one sync on an object write operation when the at least one syncing criterion is met; and initiating, by the at least one processor, the object write operation.

7. The method of claim 6, wherein the at least one sync relates to a full state event that acts as a checkpoint in reconstructing a past state.

8. The method of claim 6, wherein the at least one syncing criterion includes at least one from among a time-based syncing criterion and an event-based syncing criterion.

9. The method of claim 6, further comprising:
receiving, by the at least one processor via a graphical user interface, at least one new syncing criterion; and
updating, by the at least one processor, the predetermined sync schedule based on the at least one new syncing criterion.

10. A computing device configured to implement an execution of a method for facilitating usage and storage of bi-temporal data, the computing device comprising:
a processor;
a memory; and
a communication interface coupled to each of the processor and the memory,
wherein the processor is configured to:
receive, via an application programming interface, at least one update request, the at least one update request relating to an update of at least one data object with a new data object;
identify at least one builder pattern that corresponds to the at least one data object based on a data type of the at least one data object,
wherein the at least one builder pattern relates to a design pattern that separates construction of the at least one data object from representation of the at least one data object;
automatically generate, by using the identified at least one builder pattern, at least one delta object based on the at least one request, the at least one delta object relating to a difference between the at least one data object and the new data object;
associate the at least one delta object with at least one axial value, the at least one axial value including a reported time and an effective time; and
persist the at least one delta object and the corresponding association as an event that represents the difference between the at least one data object and the new data object.

11. The computing device of claim 10, wherein the data type of the at least one data object includes at least one from among a list data type, a set data type, and a dictionary data type.

12. The computing device of claim 10, wherein the reported time relates to a first time when a change of state is known in a database, and wherein the effective time relates to a second time when the change of state occurred.

13. The computing device of claim 10, wherein the processor is further configured to:
receive, via the application programming interface, at least one state request, the at least one state request relating to a past state of the at least one data object for a requested time;
identify, by using the at least one axial value, at least one past event that is proximate in time to the requested time, the at least one past event corresponding to the at least one data object; and
reconstruct the past state of the at least one data object by using the identified at least one past event and the at least one axial value.

14. The computing device of claim 13, wherein the processor is further configured to:
generate the past state of the at least one data object based on a result of the reconstructing; and
transmit, via the application programming interface, the generated past state in response to the at least one state request.

15. The computing device of claim 10, wherein the processor is further configured to:
determine whether at least one syncing criterion is met, the at least one syncing criterion relating to a predetermined sync schedule;
automatically generate at least one sync on an object write operation when the at least one syncing criterion is met; and
initiate the object write operation.

16. The computing device of claim 15, wherein the at least one sync relates to a full state event that acts as a checkpoint in reconstructing a past state.

17. The computing device of claim 15, wherein the at least one syncing criterion includes at least one from among a time-based syncing criterion and an event-based syncing criterion.

18. The computing device of claim 15, wherein the processor is further configured to:
receive, via a graphical user interface, at least one new syncing criterion; and
update the predetermined sync schedule based on the at least one new syncing criterion.

19. A non-transitory computer readable storage medium storing instructions for facilitating usage and storage of bi-temporal data, the storage medium comprising executable code which, when executed by a processor, causes the processor to:
receive, via an application programming interface, at least one update request, the at least one update request relating to an update of at least one data object with a new data object;
identify at least one builder pattern that corresponds to the at least one data object based on a data type of the at least one data object,
wherein the at least one builder pattern relates to a design pattern that separates construction of the at least one data object from representation of the at least one data object;
automatically generate, by using the identified at least one builder pattern, at least one delta object based on the at least one request, the at least one delta object relating to a difference between the at least one data object and the new data object;
associate the at least one delta object with at least one axial value, the at least one axial value including a reported time and an effective time; and
persist the at least one delta object and the corresponding association as an event that represents the difference between the at least one data object and the new data object.

20. The storage medium of claim 19, wherein the executable code further causes the processor to:
receive, via the application programming interface, at least one state request, the at least one state request relating to a past state of the at least one data object for a requested time;

identify, by using the at least one axial value, at least one past event that is proximate in time to the requested time, the at least one past event corresponding to the at least one data object; and reconstruct the past state of the at least one data object by using the identified at least one past event and the at least one axial value.

\* \* \* \* \*